United States Patent
Cords (10) Patent No.: US 8,497,616 B2
(45) Date of Patent: Jul. 30, 2013

(54) MULTISTAGE LIQUEFIED GAS EXPANDER WITH VARIABLE GEOMETRY HYDRAULIC STAGES

(75) Inventor: Michael Lee Cords, Sparks, NV (US)

(73) Assignee: Ebara International Corporation, Sparks, NV (US)

(*) Notice: Subject to any disclaimer, the term of this patent is extended or adjusted under 35 U.S.C. 154(b) by 305 days.

(21) Appl. No.: 13/098,341

(22) Filed: Apr. 29, 2011

(65) Prior Publication Data

US 2011/0271666 A1    Nov. 10, 2011

Related U.S. Application Data

(60) Provisional application No. 61/343,694, filed on May 5, 2010.

(51) Int. Cl.
*H02K 3/00* (2006.01)
(52) U.S. Cl.
USPC .............................. 310/200; 310/179; 290/52
(58) Field of Classification Search
USPC .................... 310/179, 184, 161, 200; 290/52, 290/54
See application file for complete search history.

(56) References Cited

U.S. PATENT DOCUMENTS

| | | | |
|---|---|---|---|
| 3,794,456 A * | 2/1974 | Jelusic | 415/61 |
| 4,362,020 A * | 12/1982 | Meacher et al. | 60/657 |
| 5,659,205 A * | 8/1997 | Weisser | 290/52 |
| 6,441,508 B1 | 8/2002 | Hylton | |
| 2002/0070560 A1 * | 6/2002 | Hylton | 290/52 |
| 2006/0186671 A1 | 8/2006 | Honda et al. | |
| 2008/0122226 A1 * | 5/2008 | Madison | 290/52 |
| 2011/0210556 A1 * | 9/2011 | Madison | 290/52 |

OTHER PUBLICATIONS

Kimmel et al., "Thermo-fluid dynamics and design of liquid-vapour two-phase LNG expanders," Advances in process equipment, Feb. 2010, Gas Processors Association, UK.

* cited by examiner

*Primary Examiner* — Thanh Lam
(74) *Attorney, Agent, or Firm* — Woodcock Washburn LLP (57) ABSTRACT

Embodiments are directed to an expander having two or more hydraulic stages with different physical geometries. In an embodiment, a first hydraulic stage uses nozzle vanes machined with a first geometry, while a second hydraulic stage uses nozzle vanes machined with a second geometry. Different nozzle vanes can be combined to tune the performance of the expander as the optimal operating conditions change. In yet another embodiment, an expander is equipped with a generator having a double wound stator with two sets of parallel windings. For high operating loads greater than a threshold, a first set of windings operates while a second set of windings, operating at a lower frequency, is disconnected. For operating loads that are less than the threshold, the first set of windings is disconnected and the second set of windings operates, enabling the generator to continue to operate close to 100% load for less expander power.

24 Claims, 5 Drawing Sheets

MULTISTAGE LIQUEFIED GAS EXPANDER WITH VARIABLE GEOMETRY HYDRAULIC STAGES

CROSS-REFERENCES TO RELATED APPLICATIONS

This application claims priority to U.S. Provisional Application No. 61/343,964, filed May 5, 2010, which is incorporated by reference in its entirety to be considered part of this specification.

BRIEF DESCRIPTION OF THE INVENTION

Embodiments are directed to an expander having two or more hydraulic stages with different physical geometries. In an embodiment, a first hydraulic stage uses nozzle vanes machined with a first geometry, while a second hydraulic stage uses nozzle vanes machined with a second geometry. Different nozzle vanes can be combined in an expander to tune the performance of the expander as the optimal operating conditions change. In yet another embodiment, an expander is equipped with a generator having a double wound stator with two sets of parallel windings. For operating loads greater than a threshold, a first set of windings operates and is connected to the power grid while a second set of windings is disconnected. For operating loads that are less than the threshold, the first set of windings is disconnected and the second set of windings operates and is connected to the power grid, enabling the generator to continue to operate at 100% load for 50% expander power.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

In 1895 Carl von Linde, a German engineer, invented the first continuous process for gas liquefaction. Von Linde's liquefaction process was based on repeating cycles of gas compression, pre-cooling of the compressed gas in a heat exchanger and expansion of the compressed pre-cooled gas across a Joule-Thomson throttling valve. This process yielded the desired result, but unfortunately had a high energy consumption that made it commercially unattractive.

In 1902 the French engineer George Claude developed a piston expansion engine to replace the Joule-Thomson valve to extract mechanical work from the gas expansion process, thus increasing the efficiency and reducing the high energy consumption of the von Linde design. To further reduce the cost of gas liquefaction, the first turbo-gas expander was introduced in 1964 by the Elliott Turbomachinery Company. The comparatively high efficiency of radial inflow turbo-gas expanders of this design compared to the piston expanders of the Claude design allowed more work to be extracted from the compressed gas, resulting in a further reduction in power consumption and a net increase in process efficiency.

Whilst the inefficient expansion process across a Joule-Thomson valve was already eliminated for the gaseous phase in 1902, for many years it remained the only solution to expand the liquefied cryogenic gas in the liquid phase. For the particular case of liquefied gases used as a fuel, like propane, ethane and methane, it was not until 1995 that the first generation of LNG liquid expanders was available to be installed at a liquefaction plant in Malaysia. The engineering challenges associated with the design of engines operating at cryogenic temperatures coupled with the stringent safety and hazard rules for explosive fluids prevented the technology from being commercially available prior to this installation.

The ten years following the initial concept for cryogenic LNG expanders saw many developments and technological advances that dramatically improved the performance, reliability and efficiency of the machines. In addition, the size and complexity of the devices were greatly reduced. The increase in overall process plant efficiency and resultant increase in product liquid were well established during this period. As a result every new LNG liquefaction plant that has been built around the world since 1995 has been equipped with liquid expanders in place of the Joule-Thomson valves.

The liquefaction of gas is in principle a Carnot refrigeration process that was first described by the French physicist Sadi Carnot in 1824. Carnot discovered that the efficiency of a heat engine is dependant only upon its input and output temperatures. For such a refrigeration process the lower the final resultant temperature, the lower the Carnot efficiency will be as more energy input is necessary to achieve the end temperature. The energy input approaches infinity for the case of an output temperature of absolute zero. In summary, this entails that more energy input is required to reduce the temperature of a fluid by one degree at a relatively lower temperature than is required to achieve the same reduction at a relatively higher temperature. When applied to a gas liquefaction process, the end result is that the Carnot efficiency of the process is proportionally lower for fluids having a lower liquefaction temperature since more energy input is required.

The purpose of liquid expanders in gas liquefaction processes is to further reduce the temperature of the liquefied gas beyond the typically very low cryogenic liquefaction temperature without going through the Carnot refrigeration process. The cryogenic liquid expander directly extracts the heat energy from the liquefied gas by expanding the liquid from a high pressure level to a low pressure level, converting the static pressure energy into kinetic fluid energy and further into mechanical torque and electrical energy where it is ultimately removed from the system. By extracting work in the form of electrical energy from the cryogenic fluid, the thermodynamic internal energy, the enthalpy, is reduced and with it the temperature is reduced.

The efficiency of this refrigeration process by means of direct enthalpy reduction across an expansion machine at the low liquefaction temperature is independent of the low Carnot efficiency that would normally be expected. In an ideal isentropic expansion machine the enthalpy reduction is equal to the static differential pressure energy reduction, while in actual expansion machines the achievable energy reduction is between 80% and 90% of this value.

The purpose of liquid expanders is very similar to that of gas expanders: (1) Gas expanders reduce the enthalpy of the natural gas in its gaseous state; (2) Liquid expanders reduce the enthalpy of the natural gas in its liquefied state. Reduced enthalpy corresponds to a reduction in temperature and is effectively a refrigeration of the natural gas. Liquid expanders reduce the pressure, the temperature and the enthalpy of the cryogenic liquefied gas stream. Therefore in the liquefaction process they can be modeled as a heat exchanger combined with a Joule-Thomson valve.

DETAILED DESCRIPTION OF THE INVENTION

Embodiments are directed to a multistage expander, operating in single phase or in two-phase, having two or more hydraulic stages with different physical geometries. In an embodiment, a first hydraulic stage uses nozzle vanes machined with a first geometry, while a second hydraulic stage uses nozzle vanes machined with a second geometry. Different nozzle vanes are combined within the expander to tune the performance of the expander as the optimal operating conditions change. Expanders disclosed can be used with liquefied natural gas (LNG) and cryogenic fluids.

Figure 1:
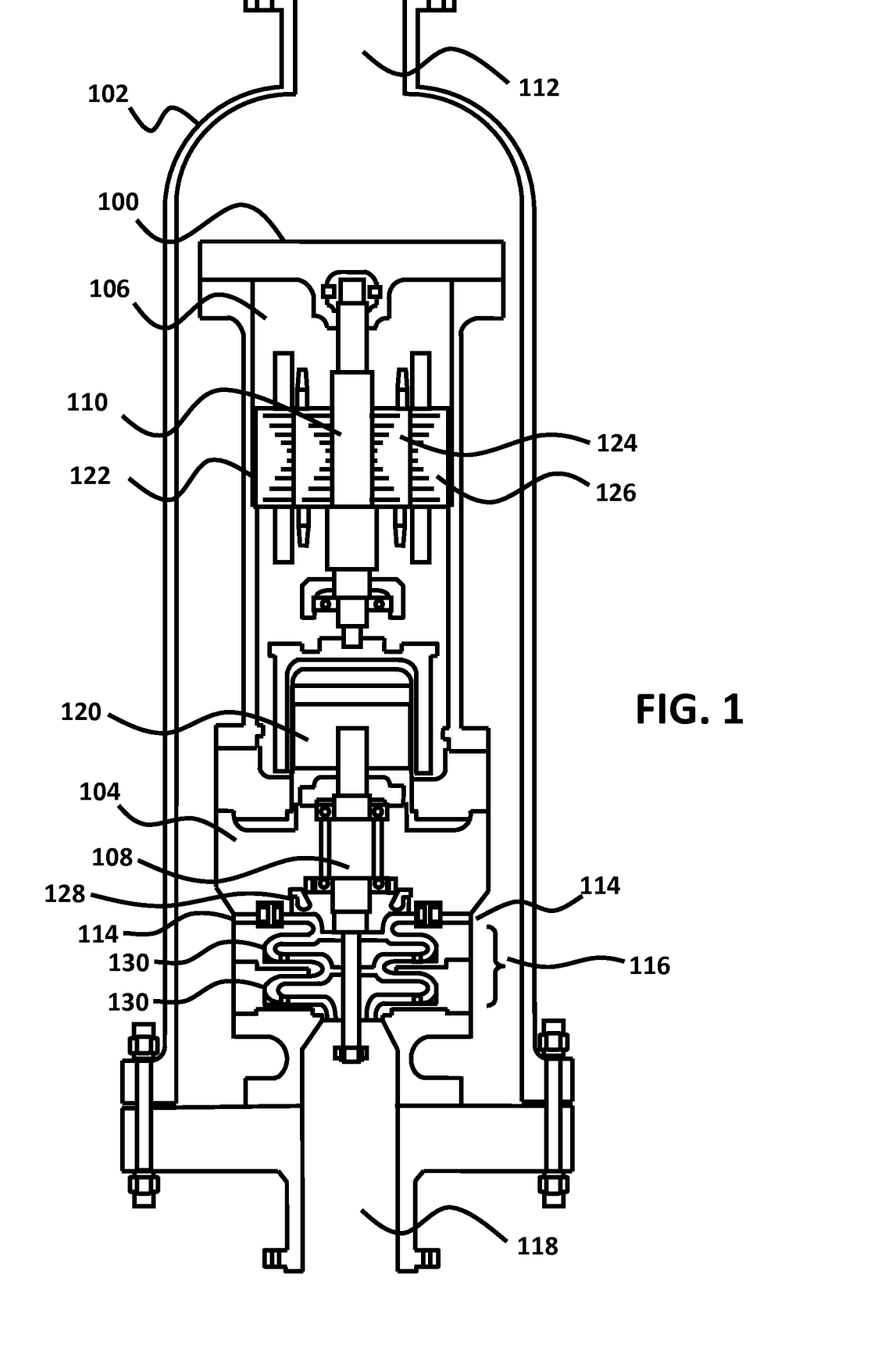
FIG. 1 illustrates an embodiment of an multistage expander equipped with a radial nozzle vane and an axial nozzle vane.

FIG. 1 illustrates an expander 100 inside a vessel 102, which is slightly larger than the expander 100. The expander 100 consists of a hydraulics section 104 and a generator section 106 mounted with a vertical rotational axis. The hydraulics section 104 and the generator section 106 can be mounted on the same shaft, or they can be mounted on separate shafts. In the expander 100 the hydraulics section 104 is mounted on a hydraulic shaft 108 and the generator section is mounted on a generator shaft 110. The hydraulics section 104 extracts the maximum amount of torque from the liquid as it flows through the expander 100.

In the embodiment illustrated in FIG. 1, the pressurized fluid enters the vessel 102 through the inlet nozzle 112 at the top of the vessel 102. The pressurized fluid flows downward between the vessel 102 and the expander 100, and enters the expander 100 at the expander inlet 114 and a hydraulic stage, as further described below. The fluid flows through various hydraulic stages 116 which lower the pressure of the fluid and transform the kinetic energy of the fluid into mechanical shaft power, which is then converted into electric energy by the electrical generator of the generator section. The fluid exits the expander 100 and the vessel 102 through the vessel outlet 118.

The vessel 102 can be manufactured from a stainless steel cryogenic alloy and certified according to pressure vessel codes. The expander 100 can be manufactured from a cryogenic aluminum alloy. A purpose of the pressure vessel is to protect the expander against mechanical damage, and fire incidents when dealing with a flammable liquid. The use of stainless steel alloy allows the vessel 102 to withstand flames, pressure, corrosion, and carries the thermal insulation between cryogenic temperature and the environment.

A nozzle ring, positioned at the inlet of each hydraulic stage, converts the pressure energy of the fluid into kinetic energy, thereby generating efficient angular Euler momentum with minimal losses. The nozzle ring is mounted on the hydraulic shaft 108, it is static and non-rotating. The nozzle ring can be configured a number of different ways, such as a fixed vane nozzle ring, and is configured to direct the flow into Francis type radial inflow runners, which are designed to extract the maximum amount of torque from the fluid as possible. The nozzle rings with converging nozzles generate high-velocity vortex flow while the turbine runners convert the angular fluid momentum into shaft torque.

In an alternative embodiment, the expander 100 may be assembled upside down, with the generator section 106 positioned at the bottom of the expander 100 and with the hydraulics section 104 positioned at the top of the expander 100. In such an embodiment, fluid may enter through an inlet at the bottom of the vessel 102 or through a horizontal inlet, positioned on either the left or right side, near the bottom of the vessel 102. In such an embodiment, the pressurized fluid flows upward between the vessel 102 and the expander 100, entering the expander, and flowing through the various hydraulic stages. Other configurations are also undoubtedly possible, but regardless of the configuration, the principles described herein remain applicable.

The expander 100 illustrated in FIG. 1 has three runner stages 116, but embodiments of multistage expanders disclosed herein can have two or more runner stages with the nozzle vanes of the nozzle ring upstream to each runner stage having a different physical geometry. As indicated above, the liquid flowing through the runner stages 116 causes the hydraulic shaft 108 to turn. In the embodiment illustrated in FIG. 1, the turning of the hydraulic shaft 108 causes a magnetic difference in the magnetic coupling 120. The magnetic coupling 120 transfers the power from the hydraulic shaft 108 to the generator shaft 110.

A generator 122, mounted on the generator shaft 110, is comprised of a rotor 124 and a stator 126. It is to be understood that while expander 100 uses a magnetic coupling 120 to transfer torque from the hydraulic shaft 108 to the generator shaft 110, other embodiments can use alternative means for transferring the torque from the hydraulic shaft 108 to the generator shaft 110. As further discussed above, an expander can also consist of a single shaft, with both the hydraulic section and the generator section mounted on the same shaft.

The magnetic coupling 120 consists of two matching rotating parts, one rotating part mounted on the hydraulic shaft 108 and one rotating part mounted on the generator shaft 110 next to each other and separated by a non-rotating membrane mounted to the generator section 106. The operation of a magnetic coupling is known in the art.

The expander 100 may also use a Thrust Equalizing Mechanism (TEM) device 128 for balancing hydraulic thrust. The TEM device 128 ensures that the bearings supporting the hydraulic shaft 108 are not subjected to axial loads within the normal operating range of the expander 100. Axial force along the expander 100 is produced by unbalanced pressure, dead-weight and liquid directional change. Self adjustment by the TEM device 128 allows the bearings supporting the hydraulic shaft 108 to operate at near-zero thrust load over the entire usable capacity range for expanding. This consequently increases the reliability of the bearings, and reduces equipment maintenance requirements. Expanders comprised of a single shaft can also include the TEM device. Yet other embodiments of expanders may not include the TEM device 128.

Single-phase expanders can be used when the expanded liquid will remain liquid up to or near the discharge of the final runner. The runners can be designed for a wide range of flow rates, and can be supplied with one or more nozzle ring and runner stages to provide a wide range of pressure reduction capabilities. The use of variable geometry for the various nozzle vanes in each hydraulic stage enables the performance of the expander to be fine tuned in a controlled and predictable manner, allowing the performance of the expander to be adapted to a wide range of operating conditions.

Two-phase expanders can be used to replace the JT valves used for two-phase expansion. A two-phase expander recovers most of the available energy from the liquid stream while further cooling the liquid and thus reducing boil off downstream and increasing liquid production. Two-phase expanders can operate in expansion conditions where the liquid will begin partially vaporizing within the expander. The two-phase expander can be supplied with a variable speed or fixed speed generator and operated in the same fashion as the liquid or single phase expander. A two-phase expander may include a jet exducer installed at the discharge end of the expander, at the end of the hydraulic stages, thus allowing vapor content of up to 100% at the discharge end.

Figure 2:
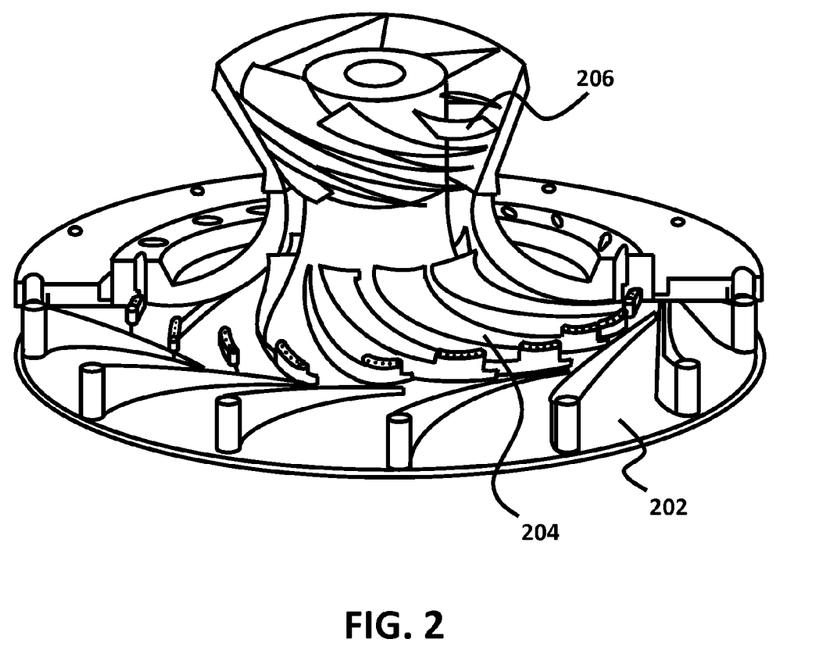
FIG. 2 illustrates an embodiment of a two-phase expander hydraulic assembly.

FIG. 2 shows a diagram of an embodiment of a two-phase hydraulic assembly used in a two-phase expander. The hydraulic assembly consists of a radial nozzle ring 202 with a plurality of nozzle vanes, a runner section 204, and a jet exducer 206. The nozzle ring 202 with converging nozzle vanes generates high-velocity vortex flow. The runner 204 converts the angular fluid momentum into shaft torque. The optional jet exducer 206 consists of a radial outflow turbine for power generation by two-phase expansion.

As the rotating fluid exits the nozzle vanes of the nozzle ring 202, it enters the runner 204 with an angular and radial direction, passing through the fluid passages formed by the guide vanes of the runner, exiting the runner in an axial and vertical direction. The design of the runner as a radial inflow turbine is such that the outlet angular Euler momentum is zero with no remaining rotational fluid energy at the exit of the runner 204 and the entrance of the jet exducer 206.

The jet exducer 206 rotates together with the runner 204. The jet exducer 206 is a radial outflow turbine, also known as Hero's turbine, with no inlet angular momentum. The purpose of the exducer 206 is to generate a negative outlet angular momentum. A negative outlet angular momentum increases the differential angular Euler momentum, resulting in an increased shaft torque and shaft power. The guide vanes for the fluid flow through the exducer 206 are helically wrapped around the shaft with cross sections increasing in size.

The saturated LNG begins to vaporize at the inlet of the exducer 206 forming a liquid-vapor two-phase fluid flow. The volume of the vaporizing LNG increases as it passes through the helical guide vanes of the exducer 206, increasing the velocity of the fluid. The increase in fluid velocity causes a drop in the pressure due to Newton's Conservation of Energy Law. The drop in pressure increases the LNG vaporization at any location inside the guide vanes due to the thermodynamic properties. Increased vaporization increases the volume and the fluid velocity, causing further pressure drop in the fluid. The described vaporization-volume-velocity-pressure cycle is effective at any location within the helical guide vanes and repeats itself until the liquid-vapor mixture exits the exducer 206 with a high fluid velocity. At the exit of the exducer 206 the two-phase fluid reaches a high exit velocity approaching the speed of sound, forming a jet-like fluid stream exiting the exducer 206. This jet-like fluid stream exerts a reaction force on the exducer 206, which causes additional torque to be generated. As a result the total power extracted from the fluid is significantly increased due to this additional expansion step.

The high rotational exit velocity generates a large negative outlet momentum increasing the differential angular Euler momentum. The design of the jet exducer 206 is applicable to liquid-vapor two-phase fluids of any ratio between vapor and liquid, including single-phase fluids as liquid or as vapor. Operating the expander with variable rotational speed enables the expansion of single and two-phase fluids with smooth and uninterrupted transition across all phase ratios.

The large negative outlet angular momentum increases the shaft torque but also causes the fluid to exit the jet exducer 206 with a remaining rotational kinetic energy. In an embodiment, this rotational kinetic energy is recovered by converting the rotational kinetic energy into static pressure energy by using a condensation cone. The fluid passes through a condensation cone designed like a turbine draft tube with flow straightener. The non rotating condensation cone is mounted at the end of the hydraulic stages. The guide vanes of the condensation cone are helically shaped with changing pitch. The pitch of the helical vanes at the inlet is small and increases continuously in an upward direction until the vanes are parallel to the shaft axis. The helical vanes are attached to the conically shaped centre piece. The condensation cone reduces the fluid velocity to the necessary axial fluid velocity at the outlet nozzle of the pressure vessel. Thus the rotational fluid energy is converted into pressure energy due to Newton's Conservation of Energy Law transforming kinetic energy into static energy.

Expanders are typically used at the end of a traditional liquefaction process. The high pressure liquid stream enters the vessel (either from the top, side, or bottom as mentioned above) passing through the expander and exiting under low pressure through the outlet of the expander and the vessel. Each hydraulic stage is comprised of at least a non-rotating nozzle ring with a plurality of nozzle vanes followed by a rotating runner. As previously noted, the nozzle ring portion converts the static pressure energy into kinetic rotational energy and the runner converts the resulting rotational energy into shaft torque. The generator converts the shaft torque into electrical power, with the electrical power transported by a cryogenic power cable to an external power grid.

Two-phase expanders expand the static energy in the form of the available pressure differential from the liquid phase into the liquid-vapor phase across the saturation line of the fluid. The enthalpy of the liquefied gas is reduced significantly more than it would be with single phase expanders due to the vaporization heat extracted from the liquid portion of the two-phase fluid.

Expanders assembled with the generator section at the bottom of the expander and with the hydraulics section at the top of the expander, are particularly beneficial for two-phase expanders. In such a configuration, the fluid being expanded enters through the bottom of the vessel, flows upward through the expander, and exits the vessel and the expander through the top. In two-phase expansion, liquid expands into a gaseous phase or it may alternatively expand into a part liquid and a part vapor phase. As liquid is expanded, vapor and gas bubbles are formed and the bubbles rise. As a result of the change in density, the buoyancy forces of the liquid-vapor mixture support and stabilize the fluid mixture in the upward flow direction. On the other hand, in a two phase expander oriented with liquid flowing downward through the expander, it would be necessary to push the bubbles in the downward direction. It is thus more efficient to take advantage of the buoyant forces of the bubbles and to let the bubbles rise in the direction of the flow of the liquid being expanded.

As noted, a hydraulic stage consists of a nozzle ring/vanes followed by a runner. A nozzle ring can be in two different configurations: with radial vanes or axial vanes. The amount of fluid that comes in to the nozzle ring is equal the amount of fluid that comes out of the nozzle ring. The area at the inlet of the nozzle ring formed by the nozzle vanes is larger than the area at the outlet of the nozzle ring formed by the nozzle vanes, consequently causing the fluid to speed up to exit the nozzle ring in the same volume as it enters. Thus, the purpose of a nozzle ring is to add velocity to the fluid. FIG. 2 illustrates a nozzle ring with radial nozzle vanes. In a nozzle ring with radial nozzle vanes, fluid enters through the periphery and the circumference of the nozzle ring.

Figure 3:
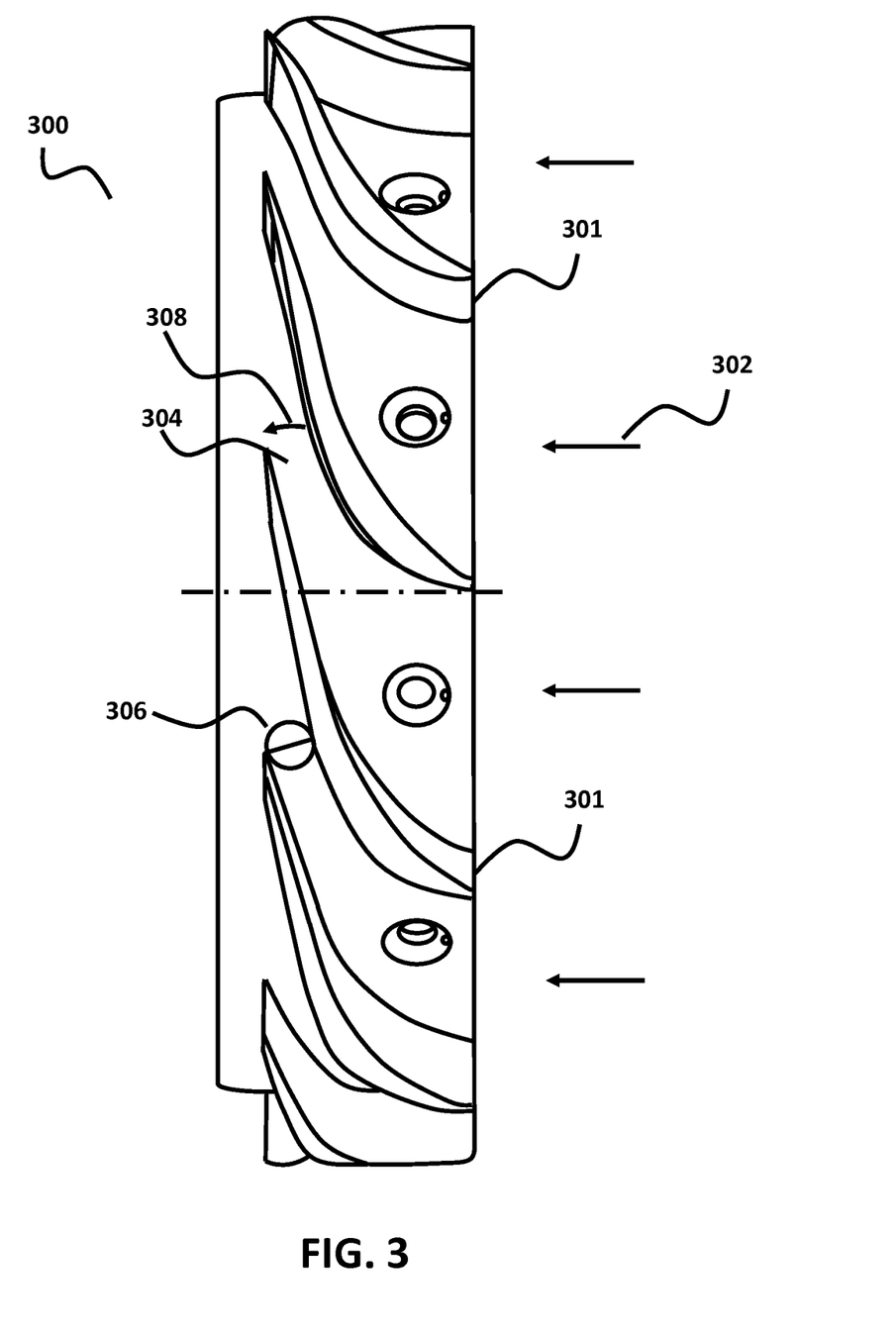
FIG. 3 illustrates an embodiment of an axial nozzle vane.

FIG. 3 illustrates a nozzle ring 300 with axial nozzle vanes 301. The fluid enters the nozzle ring 300 along direction 302. The nozzle ring 300 is positioned on expander 100 where the inlet 114 meets the first hydraulic stage 116 and along points 130 of the each of the subsequent hydraulic stages 116. The fluid is turned and its velocity is increased as the fluid passes through the smaller area at the outlet 304 of the nozzle ring 300. The fluid comes out at an angle and at a higher speed. As the fluid exits the nozzle ring 300, the fluid goes into the runner. The runner is connected to the shaft, and as the fluid flows through the runner, it makes the runner turn, which consequently makes the shaft turn. The torque on the shaft is converted to energy by the generator.

Figure 4:
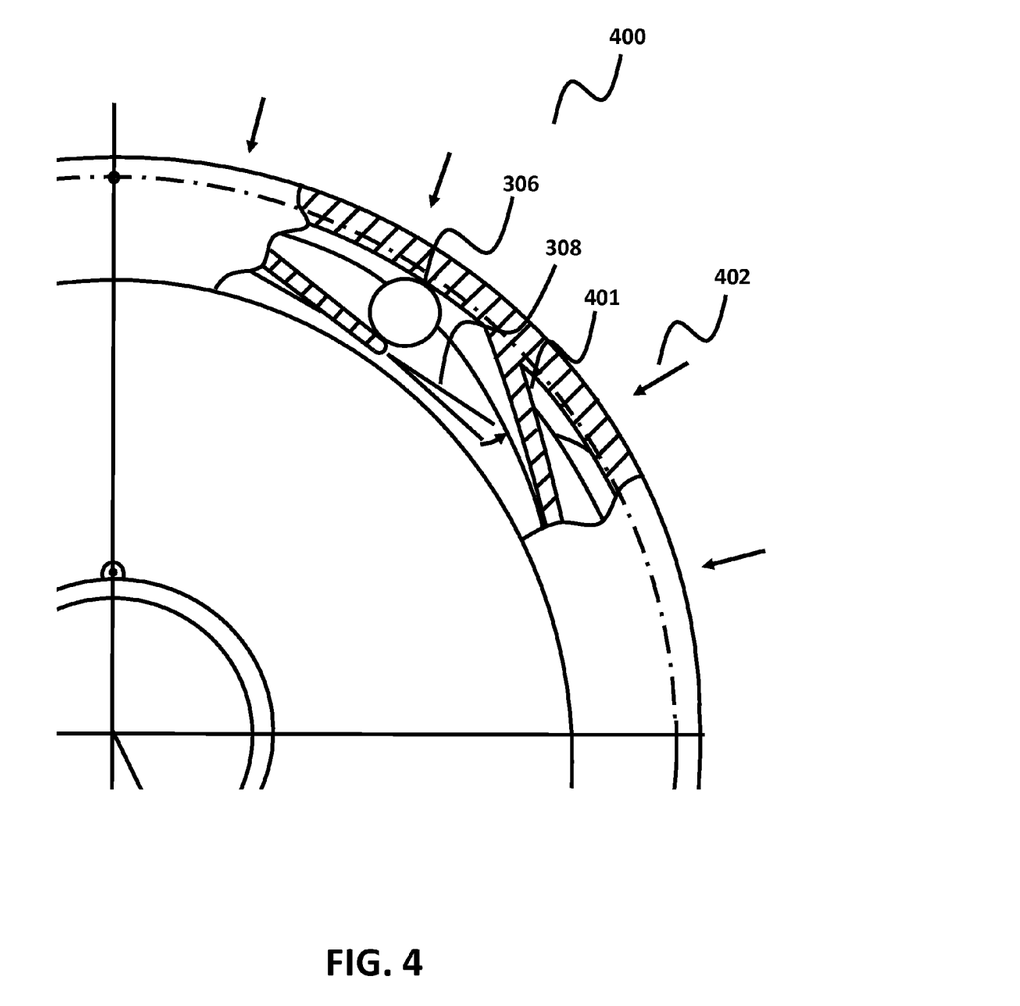
FIG. 4 illustrates a plan view of a radial nozzle vane.

A nozzle ring affects the velocity of a fluid. In particular, the configuration of the nozzle vanes of the nozzle ring determines the speed and direction of the fluid as it exits the nozzle vanes. Speed is a function of the area created by the nozzle vanes, specifically the area of the throat diameter, or ball diameter, of the nozzle vanes illustrated by the circle 306. The throat of the nozzle vanes is the smallest area of the nozzle vanes. The outlet angle 308 of the nozzle vanes controls the angle of the fluid as it exits each nozzle vane pair. As noted above, a hydraulic stage is made up of a nozzle ring followed by a runner. FIG. 4 illustrates a nozzle ring 400 with radial nozzle vanes 401. Fluid enters the nozzle ring 400 along its circumference along direction 402. The radial nozzle vanes 401 are positioned at the first hydraulic stage adjacent to the inlet 114 of the expander 100 and along points 130 of each subsequent hydraulic stage 116.

As the fluid goes through the runner, the fluid slows down, and so the runner takes energy from the liquid. As the fluid goes through a first hydraulic stage, it is at a high pressure. The fluid speeds up as it goes through the nozzle vane, and it slows down as it goes through the runner, which reduces the pressure of the fluid. When larger expansion is needed, additional hydraulic stages can be used, with each hydraulic stage reducing the pressure further.

In embodiments herein, different geometries can be used at the different hydraulic stages of a multistage expander to fine tune the performance of the expander. A first hydraulic or runner stage can have a nozzle ring with nozzle vanes having a first nozzle outlet angle and a first nozzle throat diameter. A second hydraulic or runner stage can have a second nozzle outlet angle and a second nozzle throat diameter different than the first nozzle outlet angle and the first nozzle throat diameter. A third hydraulic or runner stage can have yet another different third nozzle outlet angle and a third nozzle throat diameter, and so on.

The performance of an expander is determined by the flow rate and the pressure drop. The performance of an expander can be plotted in a map enabling a user to determine that at a first particular flow rate, the expander reduces the fluid pressure by a particular amount, while at a second particular flow rate, the machine reduces the fluid by a second particular amount of pressure. If a process is needed to achieve a desired flow rate and a desired pressure drop, a particular expander may not meet the process requirements.

Figure 5A:
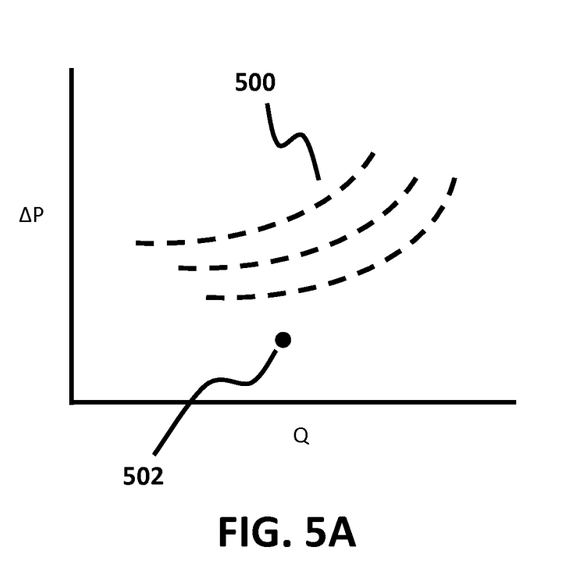
FIG. 5A illustrates an example of a map with three head curves for a two-stage expander with identical hydraulic stages.

FIG. 5A illustrates an example of a map showing the performance of an expander, with the x-axis denoting volumetric flow rate and the y-axis denoting differential pressure. Each characteristic curve 500 is associated with a hydraulic stage. For a given flow rate, it can be determined what pressure change will be achieved by the expander. In the plot illustrated in FIG. 5A, at a higher flow rate, the expander will reduce further the pressure of the fluid. However, if it was desired to operate the expander at a point 502 that falls outside of the possible performance of the hydraulic stages of the expander, then it would be necessary to adjust the expander in some manner.

Typically there have been two main methods to adjust the performance of an expander to enable the expander to operate at a desired performance. One method is to vary the speed of the machine. By varying the speed of the machine, the performance map will change accordingly, enabling the expander to operate closer to the desired performance point 502 that originally was not possible with the original configuration of the expander.

The speed of an expander can be controlled via the electrical generator. The generator is connected to an inverter drive, and the inverter drive electrically controls the expander. As fluid flows through the expander, braking torque is applied to the generator to keep the generator turning at a desired frequency, and consequently enabling the expander to operate at a constant speed regardless of the fluid flow rate.

The performance of an expander can also be tuned with the use of wicket gates. Wicket gates are comprised of nozzle vanes mounted on pivots. The nozzle vanes can be mechanically controlled to enable the nozzle vanes to be moved around the pivots. A mechanical device is used to tilt the nozzle vanes back and forth, changing the geometry of the nozzle vanes. Specifically, the pivots change the nozzle throat diameter and the nozzle outlet angle. However, even when wicket gates are utilized in expanders with multiple hydraulic stages, each hydraulic stage is changed in the same way, with the wicket gates being adjusted exactly the same for each hydraulic stage of the expander. All of the wicket gates of each hydraulic stage are change in the same manner because this results in predictable changes in the performance of the expander. In order to have a predictable performance, a fixed performance is associated with each hydraulic stage. Thus, if the output pressure needs to be increased or decreased, the performance of the expander can be adjusted in a predictable fashion by increasing or decreasing the throat diameter by the same degree.

In an embodiment, spare sets of nozzle rings with differently configured nozzle vanes are used at each hydraulic stage to fine tune the performance of the expander. Nozzle rings with a set of nozzle vanes having a first fixed geometry can be swapped out of an expander with a spare nozzle ring with set of nozzle vanes having a different second fixed geometry, enabling the performance of the machine to be tuned. An expander with three stages can have three nozzle rings with the same first set of nozzle vanes used with each of the three hydraulic stages in the expander. If there was a need to tune or change the performance of the machine, the first nozzle ring could be removed from the expander and replaced with a different nozzle ring having a second set of nozzle vanes, with the first set of nozzle vanes being different from the second set of nozzle vanes. Changing the first set of nozzle vanes with the different second set of nozzle vanes would enable the performance of the expander to be tuned. The third hydraulic stage could be likewise modified to further tune the expander.

Embodiments disclosed herein improve on methods for tuning the performance of an expander by combining nozzle vanes with different geometries across the various hydraulic stages of a multistate expander, rather than providing hydraulic stages that have identical geometries. For instance, the first hydraulic stage may have a first nozzle throat diameter that is very narrow, the second hydraulic stage may have a second nozzle throat diameter that is slightly larger than the first nozzle throat diameter, and a third hydraulic stage may have a third nozzle throat diameter that is larger than the first nozzle throat diameter and the second nozzle throat diameter. Most importantly, embodiments enable the use of different geometries for the nozzle vanes in different hydraulic stages in an expander in a predictable fashion to fine tune the performance of the expander (each hydraulic stage being physically different). Such an embodiment is particularly useful in two-phase expansion, where the fluid is changing as the pressure drops.

In two phase expansion, where the system is operating with liquid and vapor, the fluid pressure and density changes as the pressure drops, with more vapor being generated as the pressure decreases. The more vapor in the fluid, the more volume the fluid spans. As the pressure is dropping and the liquid is expanding, it is desirable to have different geometries that accommodate the fluid as it expands across the various hydraulic stages. Specifically, if the mixture of the fluid becomes part liquid and part vapor after the first hydraulic stage, it would be desirable to use a nozzle vane with a different geometry to result in a different pressure drop based on the new fluid pressure and density after the first hydraulic stage.

For variable speed expanders, the device controlling the speed of the expander can occupy a large space. In many off-shore installations, such as on ships, it is desirable to have devices that are as compact as possible to reduce the amount of space occupied in a ship, as the real estate and physical size of the machinery are important. Thus, in off-shore installations, it is most desirable to use fixed speed expanders that do not require wicket gate controller equipment or variable speed control equipment. Another aspect associated with off-shore installations, is that the composition of the gas may change from a first well to a second well, or within a first well over time. As the composition of the gas changes, the preferred operating conditions change as well. In such circumstances, it is common to have an extra expander, or the need to order a new expander as the operating conditions change. Instead, embodiments disclosed herein enable the performance of the expander to be tuned predictably by replacing one or more nozzle rings with different nozzle rings having different nozzle vane geometries than those previously used in the expander. It is possible to make gross changes as well as fine changes depending on how the geometries of the nozzle vanes in the hydraulic stages are varied. This enables the expander to operate at peak efficiency as the preferred operating conditions change. The use of variable geometry in the various hydraulic stages also enables the expander to operate over a wide range of conditions without variable speed control equipment.

FIG. 5A illustrates a map showing the performance for an expander with two hydraulic stages. The map is an example of the performance of an expander having nozzle rings with three nozzle vane sets with three different configurations. For example, one of the curves represents the performance of the expander with a nozzle vane with a small throat diameter for the first hydraulic stage and for the second hydraulic stage. Another one of the curves represents the performance of the expander with a nozzle vane with a medium throat diameter for the first hydraulic stage and for the second hydraulic stage. Finally, the third curve represents the performance of the expander with a nozzle vane with a large throat diameter for the first hydraulic stage and for the second hydraulic stage. If the operating conditions of the expander changed, needing the expander to operate at the point 502, the expander would not meet the desired performance criteria.

Figure 5B:
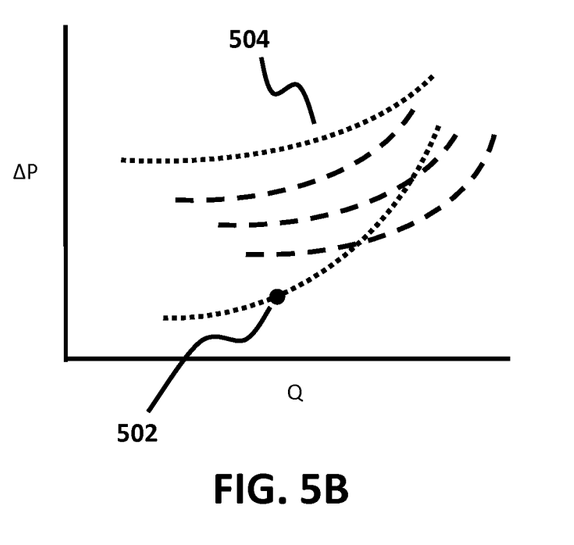
FIG. 5B illustrates an example of a map with five head curves for a two-stage expander with variable geometry hydraulic stages in accordance with an embodiment.

FIG. 5B illustrates a map for the same expander with two hydraulic stages, but including two additional curves (dotted) representing the performance of the expander with the first hydraulic stage having nozzle vanes with a different geometry than the nozzle vanes of the second hydraulic stage. One of the dotted curves may represent the performance of the expander with the nozzle vane with the small throat diameter in the first hydraulic stage and the nozzle vane with the medium throat diameter in the second hydraulic stage. The second dotted curve may represent the performance of the expander with the nozzle vane with the medium throat diameter in the first hydraulic stage and the nozzle vane with the large throat diameter in the second hydraulic stage. Other combinations include: small throat diameter—large throat diameter, large throat diameter—medium throat diameter, large throat diameter—small throat diameter, etc. Nozzle vanes having any geometries can be combined as necessary to achieve the desired performance of the expander and to meet the actual operating conditions. For a three stage machine, where the downstream hydraulic stages have a larger throat diameter or an outlet angle greater than the upstream hydraulic stages, would result in at least eight possible combinations of nozzle vanes, including: small-small-medium; small-medium-medium; medium-large-large; medium-medium-large; small-small-large; small-medium-large, etc.

It is to be understood that the geometries of the nozzle vanes can be combined in a plurality of ways. For instance, the geometries of the nozzle vanes can be combined such that each downstream hydraulic stage has a smaller nozzle throat diameter and a smaller nozzle outlet angle than each upstream hydraulic stage. Alternatively, each upstream hydraulic stage can have a smaller nozzle throat diameter than each downstream hydraulic stage. The nozzle outlet angle can also be adjusted independently of the nozzle throat diameter. For example, the hydraulic stages can be combined such that the nozzle outlet angle increases from the first hydraulic stage to the last hydraulic stage, while the nozzle throat diameter decreases from the first hydraulic stage to the last hydraulic stage. The nozzle throat diameter can also be changed non-linearly between hydraulic stages, with a first hydraulic stage having a first nozzle throat diameter smaller than the second nozzle throat diameter of the second hydraulic stage, and with the second nozzle throat diameter in turn being larger than the third nozzle throat diameter of the third hydraulic stage.

The spinning shaft in an expander can be connected to a generator, and thereby generate electricity, such an inductor squirrel cage generator. It includes a stator, a non-moving part that has some copper windings wrapped around them. Internal to the stator is the rotor, which is the rotating part. The rotation of the rotor around the stator induces an electric field in the windings of the stator, which are then harnessed and transmitted to a grid.

The relationship between the rotational speed of the shaft and the electrical frequency is determined by the number of magnetic poles in the generator. For example, in a generator with two poles, given some electrical frequency, such as 60 Hz, the shaft will spin at 3600 rpm. The more poles utilized, the slower the shaft will spin. For example, a four pole generator will spin the shaft at 1800 rpm, while a two pole generator, spinning at 3000 rpm, will generate 50 Hz electrical power.

The best efficiency point of electric induction generators is at 100% load, but that efficiency reduces significantly where there is only a 50% load. Expanders are periodically required to operate at approximately 50% load, and other times at 100% load, and the changes in load cannot be predicted. To maintain the highest efficiency for both 50% and 100% loads, a double wound stator is utilized, with two sets of parallel windings. For 100% load, a first set of windings, configured to operate at a high frequency, is connected to the power grid while the second set of windings, configured to operate at a lower frequency, is disconnected. When the expander operates at a lower load, such as a 50% load, the second set of windings is connected to the power grid and the first set of windings is disconnected. In the latter case the generator operates at 100% load for the 50% expander power, maintaining the best efficiency for the generator. One of the windings may be a two pole winding, while the other may be a four pole winding, but other configurations are possible. A switch can be used to connect and disconnect the two sets of windings in the stator.

The double wound stator enables the hydraulics and the generator to operate at their peak efficiency along a wide range of operating conditions. If operating at half load, the two pole winding can be disconnected while leaving the four pole winding connected. Once the expander reaches a higher load, such as greater than 90%, the four pole winding would be disconnected and the two pole winding would be connected. As noted, any combination of pole windings can be used in the generator for the first set of windings and for the second set of windings. For instance, a first pole winding may be a two pole winding, while the second pole winding may be a six pole winding.

The conditions for connecting and disconnecting the two sets of windings of the stator can be based on a default threshold, or it can be based on a threshold that can be set and changed by a user. For instance, when the operating load of the expander is greater than the threshold, a first set of windings can be used while the second set of windings is disconnected. When the operating load of the expander is less than the threshold, or less than a different threshold, the second set of windings can be used while the first set of windings is disconnected. As noted above, the expander can operate with a default set of thresholds specifying the conditions under which the first set of windings and the second set of windings are connected and disconnected. Alternatively, a user may be given the choice to create one or more thresholds associated with one or more operating loads of the expander, triggering the use of the first set of windings over the second set of windings and vice versa.

While embodiments have been illustrated and described herein in terms of several alternatives, it is to be understood that the techniques described herein can have a multitude of additional uses and applications. Accordingly, the invention should not be limited to just the particular description and various drawing figures contained in this specification that merely illustrate a preferred embodiment and application of the principles of the invention.

What is claimed is:

1. A multistage expander for expanding a fluid, comprising:
   a hydraulics section mounted on at least one shaft and including two or more hydraulic stages, each stage among the two or more hydraulic stages comprised of a nozzle ring and a runner, a first nozzle ring from a first hydraulic stage among the two or more hydraulic stages having a first geometry, and a second nozzle ring from a second hydraulic stage among the two or more hydraulic stages, and downstream from the first hydraulic stage, having a second geometry, wherein the first geometry is different than the second geometry, and wherein the runner causes the at least one shaft to rotate as the fluid being expanded flows through the hydraulics section; and
   a generator section including a generator mounted on the at least one shaft, the generator generating energy from rotation of the at least one shaft.

2. The multistage expander as recited in claim 1, wherein the first geometry is defined by a first set of nozzle vanes having a first nozzle outlet angle and a first nozzle throat diameter, and wherein the second geometry is defined by a second set of nozzle vanes having a second nozzle outlet angle and a second nozzle throat diameter.

3. The multistage expander as recited in claim 2, wherein the first nozzle outlet angle is different than the second nozzle outlet angle.

4. The multistage expander as recited in claim 3, wherein the first nozzle throat diameter is different than the second nozzle throat diameter.

5. The multistage expander as recited in claim 2, wherein the first nozzle throat diameter is different than the second nozzle throat diameter.

6. The multistage expander as recited in claim 2, wherein the second nozzle throat diameter is smaller or larger than the first nozzle throat diameter.

7. The multistage expander as recited in claim 2, wherein the second nozzle outlet angle is smaller or larger than the first nozzle outlet angle.

8. The multistage expander as recited in claim 1, wherein the generator is comprised of a rotor and a double wound stator with a first set of windings and a second set of windings, the first set of windings parallel to the second set of windings, wherein the first set of windings enables the rotor to operate at a first frequency and wherein the second set of windings enables the rotor to operate at a second frequency less than the first frequency.

9. The multistage expander as recited in claim 8, wherein the second set of windings is disconnected and the first set of windings operates when a load of the expander is greater than a threshold, and wherein the first set of windings is disconnected and the second set of windings operates when a load of the expander is less than the threshold.

10. The multistage expander as recited in claim 1, wherein the hydraulics section further includes a jet exducer positioned at an end of the hydraulics section further expanding the fluid.

11. The multistage expander as recited in claim 1, wherein the nozzle ring is comprised of axial nozzle vanes.

12. The multistage expander as recited in claim 1, wherein the nozzle ring is comprised of radial nozzle vanes.

13. An expander for expanding a fluid, comprising:
   a hydraulics section mounted on at least one shaft and including a first hydraulic stage, the first hydraulic stage comprised of a first nozzle ring and a first runner, wherein the first runner causes the at least one shaft to rotate as the fluid being expanded flows through the hydraulics section; and
   a generator section including a generator mounted on the at least one shaft, the generator generating energy from rotation of the at least one shaft, the generator comprised of a rotor and a double wound stator, the double wound stator having a first set of windings and a second set of windings parallel to the first set of windings, wherein the first set of windings enables the rotor to operate at a first frequency and wherein the second set of windings enables the rotor to operate at a second frequency less than the first frequency.

14. The expander as recited in claim 13, wherein the second set of windings is disconnected and the first set of windings operates when a load of the expander is greater than a threshold, and wherein the first set of windings is disconnected and the second set of windings operates when a load of the expander is less than the threshold.

15. The expander as recited in claim 13, wherein the hydraulics section further includes a second hydraulic stage downstream from the first hydraulic stage, the second hydraulic stage comprised of a second nozzle ring and a second runner, wherein the first nozzle ring has a first geometry, wherein the second nozzle ring has a second geometry, wherein the first geometry is different than the second geometry.

16. A method of tuning a performance of a multistage expander expanding a fluid, the multistage expander having a hydraulics section mounted on at least one shaft and including two or more hydraulic stages, each stage among the two or more hydraulic stages comprised of a nozzle ring and a runner, a first nozzle ring from a first hydraulic stage among the two or more hydraulic stages having a first geometry, and a second nozzle ring from a second hydraulic stage among the two or more hydraulic stages having a second geometry, the multistage expander further having a generator section including a generator mounted on the at least one shaft, the generator generating energy from rotation of the at least one shaft, comprising the steps of:
   analyzing a current operating condition of the multistage expander;
   identifying a desired flow rate of the fluid and a desired pressure change of the fluid;
   identifying a third nozzle ring among a plurality of nozzle rings having a third geometry that would modify the performance of the multistage expander to match the desired flow rate and the desired pressure change, the third geometry being different than the first geometry and the second geometry;
   removing the first nozzle ring from the first hydraulic stage; and
   installing the third nozzle ring in the first hydraulic stage.

17. The method as recited in claim 16, wherein the second hydraulic stage is downstream from the first hydraulic stage, wherein the first geometry is defined by a first set of nozzle vanes having a first nozzle outlet angle and a first nozzle throat diameter, wherein the second geometry is defined by a second set of nozzle vanes having a second nozzle outlet angle and a second nozzle throat diameter, wherein the third geometry is defined by a third set of nozzle vanes having a third nozzle outlet angle and a third nozzle throat diameter, and wherein the first nozzle throat diameter and the third nozzle throat diameter are smaller or larger than the second nozzle throat diameter.

18. The method as recited in claim 16, wherein the second hydraulic stage is downstream from the first hydraulic stage, wherein the first geometry is defined by a first set of nozzle vanes having a first nozzle outlet angle and a first nozzle throat diameter, wherein the second geometry is defined by a second set of nozzle vanes having a second nozzle outlet angle and a second nozzle throat diameter, wherein the third geometry is defined by a third set of nozzle vanes having a third nozzle outlet angle and a third nozzle throat diameter, and wherein the first nozzle outlet angle and the third nozzle outlet angle are smaller or larger than the second nozzle outlet angle.

19. The method as recited in claim 16, wherein the generator is comprised of a rotor and a double wound stator with a first set of windings and a second set of windings, the first set of windings parallel to the second set of windings, wherein the first set of windings enables the rotor to operate at a first frequency and wherein the second set of windings enables the rotor to operate at a second frequency less than the first frequency.

20. The method as recited in claim 19, further comprising the steps of:
   monitoring a load of the multistage expander;
   disconnecting the second set of windings and connecting the first set of windings when the load of the multistage expander is greater than a threshold; and
   disconnecting the first set of windings and connecting the second set of windings when the load of the multistage expander is less than the threshold.

21. The method as recited in claim 20, further comprising the step of enabling a user to edit the threshold.

22. The method as recited in claim 16, wherein the hydraulics section further includes a jet exducer positioned at an end of the hydraulics section further expanding the fluid.

23. The method as recited in claim 16, wherein the nozzle ring is comprised of axial nozzle vanes.

24. The method as recited in claim 16, wherein the nozzle ring is comprised of radial nozzle vanes.

\* \* \* \* \*